(12) United States Patent
Pruyn

(10) Patent No.: US 7,262,535 B2
(45) Date of Patent: Aug. 28, 2007

(54) ROTOR SHAFT FOR LIMITED ROTATION MOTORS AND METHOD OF MANUFACTURE THEREOF

(75) Inventor: Kristopher Pruyn, Tyngsborough, MA (US)

(73) Assignee: GSI Group Corporation, Billerica, MA (US)

( * ) Notice: Subject to any disclaimer, the term of this patent is extended or adjusted under 35 U.S.C. 154(b) by 0 days.

(21) Appl. No.: 11/015,052

(22) Filed: Dec. 17, 2004

(65) Prior Publication Data

US 2005/0134132 A1 Jun. 23, 2005

Related U.S. Application Data

(60) Provisional application No. 60/530,951, filed on Dec. 19, 2003.

(51) Int. Cl.
*H02K 21/12* (2006.01)
(52) U.S. Cl. .................. 310/156.06; 310/36
(58) Field of Classification Search ............... 310/156.01–156.84, 36, 15, 17
See application file for complete search history.

(56) References Cited

U.S. PATENT DOCUMENTS

| | | | |
|---|---|---|---|
| 4,533,891 A * | 8/1985 | Vanderlaan et al. ........ 335/272 |
| 4,635,352 A * | 1/1987 | Uhen ......................... 29/598 |
| 5,004,940 A | 4/1991 | Vanderlaan | |
| 5,225,770 A | 7/1993 | Montagu | |
| 5,424,632 A * | 6/1995 | Montagu .................... 324/146 |
| 5,936,324 A * | 8/1999 | Montagu ............... 310/156.11 |
| 6,275,319 B1 | 8/2001 | Gadhok | |
| 6,841,910 B2 * | 1/2005 | Gery ......................... 310/103 |

FOREIGN PATENT DOCUMENTS

| CH | 693014 A5 | 1/2003 |
|---|---|---|
| JP | 02307341 A * | 12/1990 |

* cited by examiner

*Primary Examiner*—Dang Le
*Assistant Examiner*—Nguyen Hanh
(74) *Attorney, Agent, or Firm*—Gauthier & Connors, LLP

(57) ABSTRACT

A limited rotation motor system that includes a rotor is disclosed wherein the rotor includes a sleeve with a first open end and an a second end having an integral closed end element, and a permanent magnet that is received through the first open end of the sleeve. The first open end of the sleeve is also adapted to receive an output device, and the second closed end is for mounting the rotor within the limited rotation motor system.

23 Claims, 3 Drawing Sheets

ROTOR SHAFT FOR LIMITED ROTATION MOTORS AND METHOD OF MANUFACTURE THEREOF

The present application claims priority to U.S. Provisional Patent Application Ser. No. 60/530,951 filed Dec. 19, 2003.

BACKGROUND

The invention relates to limited rotation motors such as galvanometers, and particularly relates to limited rotation motors used to drive optical elements such as mirrors for the purpose of guiding light beams in scanners.

Limited rotation motors generally include stepper motors and constant velocity motors. Certain stepper motors are well suited for applications requiring high speed and high duty cycle sawtooth scanning at large scan angles. For example, U.S. Pat. No. 6,275,319 discloses an optical scanning device for raster scanning applications.

Limited rotation motors for certain applications, however, require the rotor to move between two positions with a precise and constant velocity rather than by stepping and settling in a sawtooth fashion. Such applications require that the time needed to reach the constant velocity be as short as possible and that the amount of error in the achieved velocity be as small as possible. Constant velocity motors generally provide a higher torque constant and typically include a rotor and drive circuitry for causing the rotor to rotate about a central axis, as well as a position transducer, e.g., a tachometer or a position sensor, and a feedback circuit coupled to the transducer that permits the rotor to be driven by the drive circuitry responsive to an input signal and a feedback signal. For example, U.S. Pat. No. 5,424,632 discloses a conventional two-pole limited rotation motor.

A requirement of a desired limited rotation motor for certain applications is a system that is capable of changing the angular position of a load such as a mirror from angle A to angle B, with angles A and B both within the range of angular motion of the scanner, and both defined arbitrarily precisely, in an arbitrarily short time while maintaining a desired linearity of velocity within an arbitrarily small error. Both the minimum time of response of this system and the minimum velocity error are dominated by the effective bandwidth of the system. The bandwidth of the system is the concatenation of the servo amplifier bandwidth with that of the scanner.

For example, such limited rotation motors may be used in a variety of laser scanning applications, such as high speed surface metrology. Further laser processing applications include laser welding (for example high speed spot welding), surface treatment, cutting, drilling, marking, trimming, laser repair, rapid prototyping, forming microstructures, or forming dense arrays of nanostructures on various materials.

The processing speeds of such systems are typically limited by one of more of mirror speed, X-Y stage speed, material interaction and material thermal time constants, the layout of target material and regions to be processed, and software performance. Generally, in applications where one or more of mirror speed, position accuracy, and settling time are factors which limit performance, any significant improvement in scanning system bandwidth may translate into immediate throughput improvements.

There is a need, therefore, for an improved limited rotation motor system, and more particularly, there is a need for a rotor for a limited rotation motor that provides improved bandwidth.

SUMMARY

The invention provides a limited rotation motor system that includes a rotor wherein the rotor includes a sleeve with a first open end and a second end having an integral closed end element, and a permanent magnet that is received through the first open end of the sleeve. The first open end of the sleeve is also adapted to receive an output device, and the second closed end is for mounting the rotor within the limited rotation motor system. In various embodiments, the first open end may include a tapered opening, and the sleeve may be formed of a monolithic structure of any of stainless steel, beryllium, silicon carbide and/or titanium.

BRIEF DESCRIPTION OF THE DRAWINGS

The following description may be further understood with reference to the accompanying drawings in which.

The drawings are shown for illustrative purposes only.

DETAILED DESCRIPTION OF THE ILLUSTRATED EMBODIMENTS

An important requirement in the design of a servo system is the ability to respond quickly to a change in commanded velocity or position with high precision. In order to meet this requirement, servo motors are generally designed to have large torque constants and relatively large absolute torque capability so that the parasitic inertia of the motor itself and the added inertia of the load element may be accelerated quickly. The torque is proportional to the number of Ampere-turns in the field winding until either field saturation occurs or the motor fails from over heating (all other design elements remaining the same).

Applicant has discovered that overall system improvement may be achieved by increasing the bandwidth product of the limited rotation motor in accordance with various embodiments of the invention. As mentioned above, an important requirement of a limited rotation motor scanner is torque output. In this context, field saturation is a possible performance limiter. In fact, modern servo amplifiers are capable of supplying sufficient current to the stator winding that the field, e.g., as provided by a permanent magnet in the rotor, is de-magnetized by the reverse magnetic field developed by the ampere-turns of the winding. In this case, the torque of the motor cannot be increased further, and the performance of the system is limited by this torque, just as it is in the case of Ohmic over heating.

In addition, the coupling between the motor and the feedback mechanics, which are typically internal and to a greater or lesser degree integral with the motor, must be stiff enough to allow the required bandwidth. There is, however, more to the coupling than stiffness. The first torsional resonance effectively defines the upper limit of the bandwidth. In general, it is not enough that the first torsional resonance be at a higher frequency than some number, it is also necessary that the mechanical Q of the resonance be as small as possible.

The over-all system bandwidth product of prior art systems is generally limited by the performance of the motor, not the servo amplifier. The motor is either limited by torsional resonance or by the torque that it can produce. More precisely, however, it is the torque-to-inertia ratio of the motor-load system that limits performance when the torque is maximized. In other words, if the inertia of the moving parts of the system can be reduced, the performance may be improved in spite of the torque limit as long as the bandwidth and damping (inverse of Q) are maintained or improved.

Figure 1:
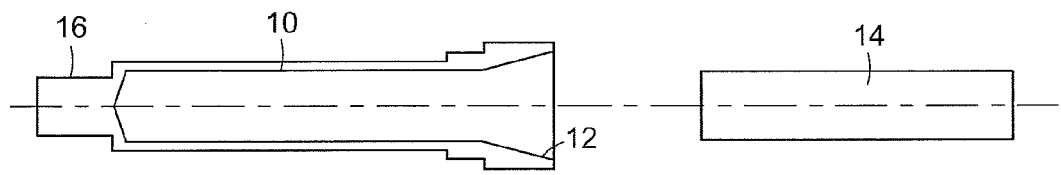
FIG. 1 shows an illustrative diagrammatic side sectional view of a rotor sleeve and magnet for use in a limited rotation motor system in accordance with an embodiment of the invention.

FIG. 1 shows a side sectional view of a rotor for use in a limited rotation motor system in accordance with an embodiment of the invention. The rotor includes a sleeve with an opening 12 at one end through which a permanent magnet 14 may be received, and an integral end member 16 at the other end of the sleeve 10. The monolithic sleeve 10 may be formed from a solid of a variety of materials including, for example, stainless steel, titanium, silicon carbide or beryllium. The sleeve 10 provides a unitary sleeve that eliminates the need for a joint at one end (by use of the integral end member 16), and provides a tapered opening 12 through which the magnet 14 may be received and to which an output device such as a mirror may be attached. A suitable output device for use in the rotor of FIG. 1 is disclosed, for example, in U.S. patent application Ser. No. 10/996,524 filed Nov. 23, 2004 (which claims priority to U.S. Provisional Patent Application Ser. No. 60/524,683 filed Nov. 24, 2003), the disclosure of which is hereby incorporated by reference.

Figure 2:
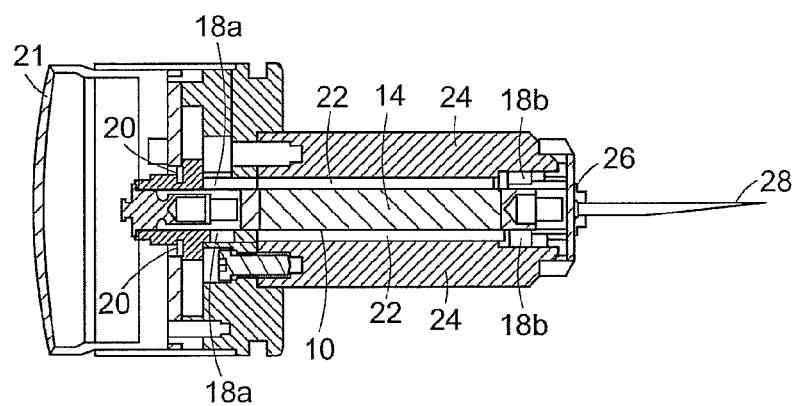
FIG. 2 shows an illustrative diagrammatic side sectional view of a limited rotation motor system in accordance with an embodiment of the invention.
Figure 3:
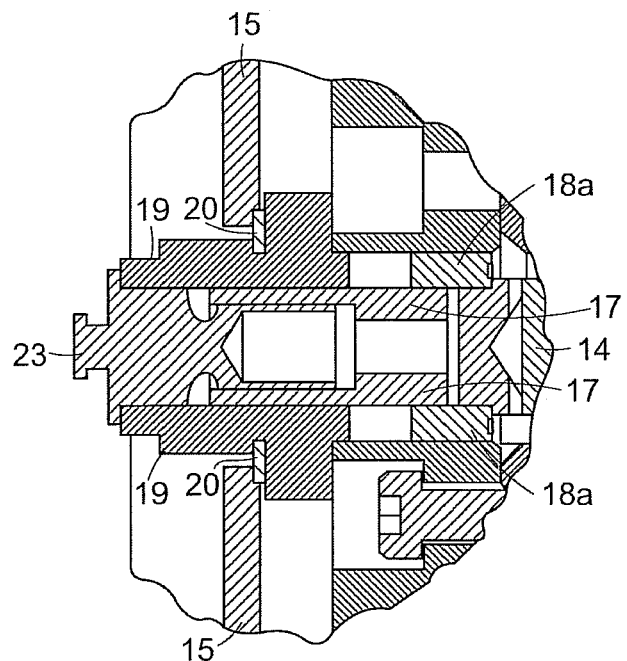
FIG. 3 shows an illustrative diagrammatic side sectional view of a portion of the limited rotation motor system shown in FIG. 2 on an enlarged scale.
Figure 4:
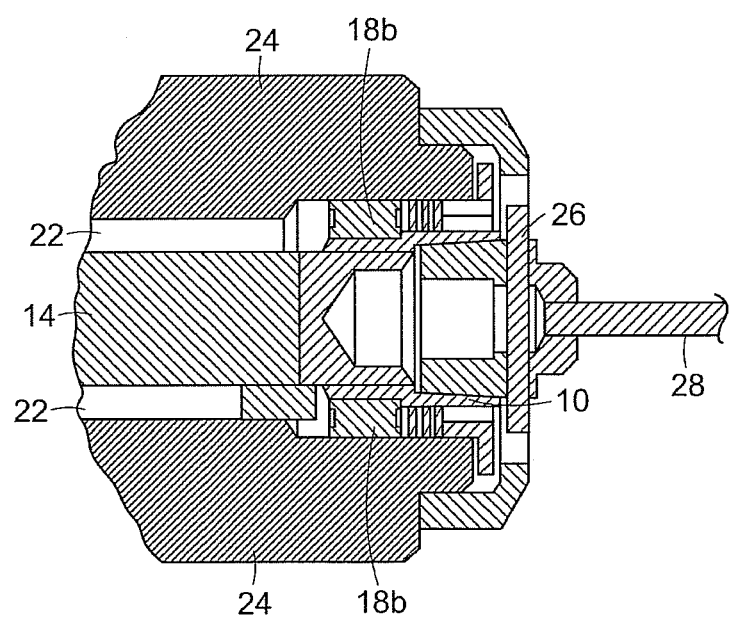
FIG. 4 shows an illustrative diagrammatic side sectional view of another portion of the limited rotation motor system shown in FIG. 2 on an enlarged scale.

FIGS. 2-4 show the rotor of FIG. 10 within a limited rotation motor in accordance with an embodiment of the invention. As shown, the sleeve 10 rotates within the galvanometer about bearings 18a and 18b. The galvanometer further includes stator coils 22 and backiron 24 that cooperate with the magnet 14 to cause rotation when an electrical current is applied to the stator coils 22. The output device 26 (having a taper that matches the tapered opening 12 of the sleeve 10) is mounted within the opening 12 of the sleeve 10 as shown in FIGS. 2 and 4.

A conductive elastomeric material 20 may also be used to couple the limited rotation motor to a position transducer 21. In particular, the elastomeric material may couple a printed circuit board 15 to a capacitive element 19 (e.g, material that includes conductive elements) of a position transducer. The position transducer may also include another capacitive element 23 and a non-conductive element 17 (e.g., ceramic) that rotates with the rotor and has a portion that is positioned between the capacitive elements 19 and 12. It has been discovered that rigid electrical connections, such as solder and wires, between the sensitive position detector stator and its associated oscillator and demodulator board have introduced mechanical stresses in the stator that resulted in strain-induced non-linearity in the ability of the position detector to accurately measure and report the actual angular position of the rotor. Also, the localized heating of the position detector stator in the region of the soldered connections during the soldering operation has resulted in subtle modification of the mechanical characteristics of the materials of construction of the position detector stator, particularly the potting material, which has led to thermal drift during subsequent operation of the scanner. The substitution of the compliant conductive elastomeric element 20 for wires, in combination with the concomitant reduction in the localized thermal stressing resulting from the deletion of the soldering process, has resulted in significant reduction in thermal drift and non-linearity of the position detector in use.

Figure 5:
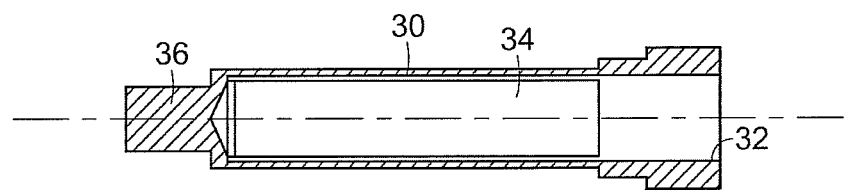
FIG. 5 shows an illustrative diagrammatic side sectional view of a rotor for use in a limited rotation motor system in accordance with another embodiment of the invention.

FIG. 5 shows a side sectional view of another rotor for use in a limited rotation motor system in accordance with another embodiment of the invention. The rotor includes a sleeve 30 with an opening 32 at one end through which a permanent magnet 34 may be received, and an integral end member 36 at the other end of the sleeve 30. Again, the monolithic sleeve 30 may be formed from a solid of a variety of materials including, for example, stainless steel, titanium, silicon carbide or beryllium. The sleeve 30 provides a unitary sleeve that eliminates the need for a joint at one end (by use of the integral end member 36), and provides an opening 32 through which the magnet 34 may be received and to which an output device such as a mirror may be attached.

Figure 6:
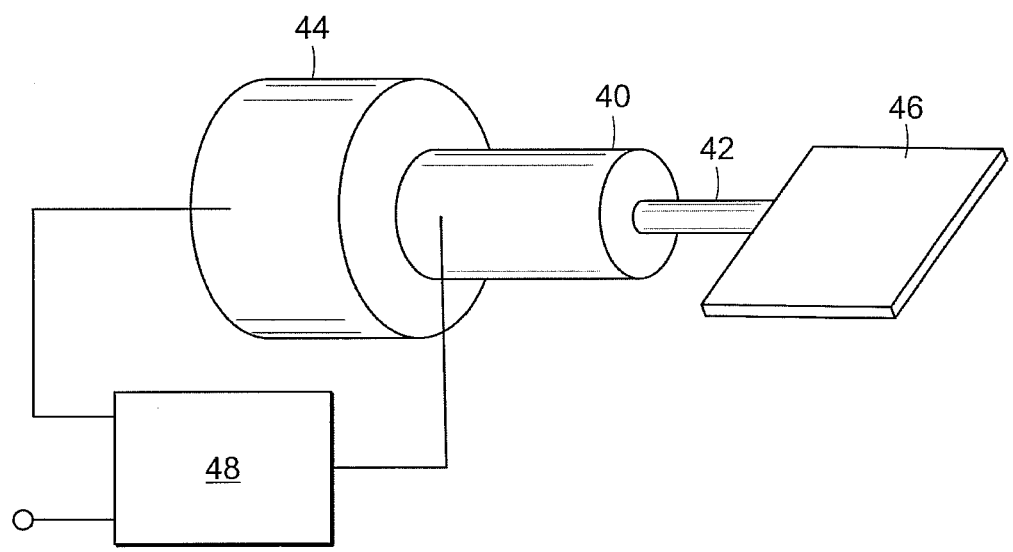
FIG. 6 shows an illustrative diagrammatic isometric view of a limited rotation motor system in accordance with another embodiment of the invention.

As shown in FIG. 6, a limited rotation motor scanner assembly including a rotor in accordance with an embodiment of the invention may include a scanner motor 40, having a rotatable rotor with an outer sleeve 42 as discussed above, with transducer 44 for monitoring the position of the rotor attached to one end of the rotor and a scanning element 46, which may comprise a mirror, attached to the output shaft of the scanner motor 40 at an opposite end from the position transducer. Of course, the scanning element 46 and the position transducer 44 may each be attached to the rotor at the same end thereof. The system also includes a feedback control system 48 that is coupled to the transducer 44 and the motor 40 as shown to control the speed and/or position of the motor.

In accordance with various embodiments therefore, the invention provides for the manufacture of a limited rotation motor rotor shaft that has reduced inertia and increased stiffness. The shaft may be formed using plating techniques to plate the magnet and low inertia materials to facilitate bonding such as by soldering.

For example, such limited rotation motors may be used in a laser drilling system for producing vias (or holes) in printed circuit boards (PCBs). The system may include a pair of galvanometer based X-Y scanners as well as an X-Y stage for transporting the PCB, and a scan lens that provides for parallel processing of circuit board regions within the field covered by the scanners and lens. The X-Y stage transports the circuit board along rows and columns needed for entire coverage. The circuit board is typically substantially larger than the scan field.

Such limited rotation motors may also be used in multi-layer drilling systems in accordance with another embodiment of the invention. The operations may include hole punching (or percussion drilling) where one or more laser pulses form a single hole within an effective spot diameter without relative movement of the beam with respect to object, or may include trepanning (which does involve relative movement between the beam and the object during the drilling operation). During trepanning, a hole having a diameter substantially larger than a spot diameter is formed. A substrate is laser drilled from a top surface of the substrate to an exposed bottom surface of the substrate using a plurality of laser pulses that are preferably trepanned in a circle, but other trepanning patterns, such as ovals and squares, may be used. For example, a trepanning pattern of movement of the laser focal spot is one in which the beam spot starts in the center of the desired via, and gradually spirals outwardly to an outer diameter of the via. At that point the beam is caused to orbit around the via center for as many revolutions as is determined necessary for the particular via. Upon completion, the focal spot is caused to spiral back to the center and thereafter awaits the next command. An example of a trepanning velocity is 3 millimeters per second. In such drilling applications, it is sometimes advantageous to provide rapid point to point positioning of the beam with a rapid settling time irrespective of the trajectory between the points.

The overall drilling system throughput can be affected by many factors such as the required number of holes within a field, hole size, stage speed, etc. System bandwidth improvements may be generally useful within a substrate drilling system, and such improvements may be particularly advantageous in substrate drilling systems wherein trepanning or similar motion is used for hole formation. Limited rotation motors discussed above may also be employed for drilling other substrates such as electronic packages, semiconductor substrates, and similar workpieces.

Such limited rotation motors may also be employed in substrate marking employing lasers, or laser marking, of for example, semiconductors, wafers and the like on either front or backsides of the substrates. The marks produced by the laser (such as a diode pumped solid state laser), whether on a front or back side, may be formed as a 1D or 2D matrix, and in compliance with various industry standards. The performance of such a system may depend, at least in part, on marking speed, density, and quality, and improvements in limited rotation motor performance may improve marking speed, density and quality. Marking speed over a field, as measured in mm/sec for example, is a function of the laser repetition rate, spot size, and the speeds of the one or motors (e.g., low and fast scan direction motors) used in the system.

In accordance with further embodiments, systems of the invention may be provided for other high speed marking applications in the electronic industry such as, for example, marking of packages or devices in trays, or other similar workpieces.

Limited rotation motors as discussed above may also be employed in laser trimming systems in accordance with further embodiments of the invention. One or more embodiments of the present invention may be used in a laser trimming system, or in a substrate micromachining system. For example, such a system may provide a method for high-speed, precise micromachining an array of devices (such as resistors), which each of the devices having at least one measurable property (such as resistance). The method includes the steps of: a) selectively micromachining a device in the array to vary a value of a measurable property; b) suspending the step of selectively micromachining; c) while the step of selectively micromachining is suspended, selectively micromachining at least one other device in the array to vary a value of a measurable property; and d) resuming the suspended step of selectively micromachining to vary a measurable property of the device until its value is within a desired range. At least one of the steps of selectively micromachining may include the steps of generating and relatively positioning a laser beam to travel in a first scanning pattern across the devices, superimposing a second scanning pattern with the first scanning pattern and irradiating at least one device with at least one laser pulse.

A micromachining system in accordance with another embodiment of the invention may provide for a fast scan pattern to be carried out using with an acousto-optic deflector, superimposed on a second, lower speed scan pattern that is carried out using a limited rotation motor as discussed above. Generally, the access or retrace time of the acousto-optic deflector is on the order of tens of microseconds. In certain embodiments improved motor speed will directly result in improved trimming speed.

Those skilled in the art will appreciate that numerous modifications and variations may be made to the above disclosed embodiments without departing from the spirit and scope of the invention.

What is claimed is:

1. A limited rotation motor system including a rotor comprising:
    a sleeve including a first open end and a second end having an integral closed end element through which a rotor shaft does not pass, said first open end for receiving an output device, and said second closed end for mounting within the limited rotation motor system, said first open end extending beyond a first bearing and being adapted for receiving an output device and said second closed end extending beyond a second bearing and being adapted for coupling said rotor to a position transducer;
    a permanent magnet received through the first open end of said sleeve; and
    a stator surrounding said sleeve for driving said permanent magnet.

2. The limited rotation motor system as claimed in claim 1, wherein said sleeve is formed of a monolithic structure.

3. The limited rotation motor system as claimed in claim 1, wherein said first open end is tapered.

4. The limited rotation motor system as claimed in claim 1, wherein said sleeve is formed of stainless steel.

5. The limited rotation motor system as claimed in claim 1, wherein said limited rotation motor system includes a conductive elastomeric material that couples the limited rotation motor system to a position transducer.

6. The limited rotation motor system as claimed in claim 5, wherein said conductive elastomeric material couples a circuit board to a capacitive element of said position transducer.

7. A limited rotation motor system including a rotor, said rotor comprising:
    a permanent magnet;
    a monolithic sleeve radially interposed between said permanent magnet and a stator, said monolithic sleeve including a first open tapered end through which said permanent magnet may be received, and a second end having an integral closed end element for mounting to a position transducer within the limited rotation motor system, said monolithic sleeve providing a rotor shaft, said first open tapered end extending beyond a first bearing and being adapted for receiving an output device and said second closed end extending beyond a second bearing and being adapted for coupling said rotor to a position transducer; and
    an output device received within said first open tapered end of said monolithic sleeve via a tapered interface between the first open tapered end of said sleeve and a tapered mounting element of said output device.

8. The limited rotation motor system as claimed in claim 7, wherein said sleeve is formed of stainless steel.

9. The limited rotation motor system as claimed in claim 7, wherein said limited rotation motor system includes a conductive elastomeric material that couples the limited rotation motor system to a position transducer.

10. The limited rotation motor system as claimed in claim 9, wherein said conductive elastomeric material couples a circuit board to a capacitive element of said position transducer.

11. A rotor for a limited rotation motor system comprising:
a sleeve with a first open end and a second end having an integral closed end element through which a rotor shaft does not pass, said first open end extending beyond a first bearing and being adapted for receiving an output device and said second closed end extending beyond a second bearing and being adapted for coupling said rotor to a position transducer; and
a permanent magnet received through the first open end of said sleeve.

12. The rotor as claimed in claim 11, wherein said sleeve is formed of a monolithic structure.

13. The rotor as claimed in claim 11, wherein said first open end is tapered.

14. The rotor as claimed in claim 11, wherein said sleeve is formed of stainless steel.

15. The rotor as claimed in claim 11, wherein said sleeve is formed of any of silicon carbide, titanium and/or beryllium.

16. A rotor for a limited rotation motor system comprising:
a permanent magnet through which no rotor shaft passes;
a monolithic sleeve with a first open tapered end, and a second end providing a closed end element through which a rotor shaft does not pass; and
an output device received within said first open tapered end of said monolithic sleeve via a tapered interface between the first open tapered end of said sleeve and a tapered mounting element of said output device;
said sleeve extending at least from between a first bearing proximate said first open tapered end to a second bearing proximate said second closed end element.

17. The rotor as claimed in claim 16, wherein said sleeve is formed of a monolithic structure.

18. The rotor as claimed in claim 16, wherein said sleeve is formed of stainless steel.

19. The rotor as claimed in claim 16, wherein said sleeve is formed of any of silicon carbide, titanium and/or beryllium.

20. A rotor for a limited rotation motor system comprising:
a permanent magnet through which no rotor shaft passes;
a sleeve with a tapered opening at a first end providing a first tapered end of the rotor, and a second end opposite the first end;
an output device received within said first tapered end of said rotor via a tapered interface between the first tapered end of said rotor and a tapered mounting element of said output device; and
a position transducer coupled to a second end of the rotor proximate the second end of the sleeve;
wherein said sleeve extends at least from between a first bearing proximate said first tapered end of the rotor to a second bearing proximate said second end of the rotor.

21. The rotor as claimed in claim 20, wherein said sleeve is formed of a monolithic structure.

22. The rotor as claimed in claim 20, wherein said sleeve is formed of stainless steel.

23. The rotor as claimed in claim 20, wherein said sleeve is formed of any of silicon carbide, titanium and/or beryllium.

* * * * *